This invention relates to the manufacture of sheet glass wherein a continuous ribbon of glass is drawn from a bath of molten glass and more specifically to a method and apparatus for insuring continuous production without periodic restarts due to breakage or major cracking of the ribbon.

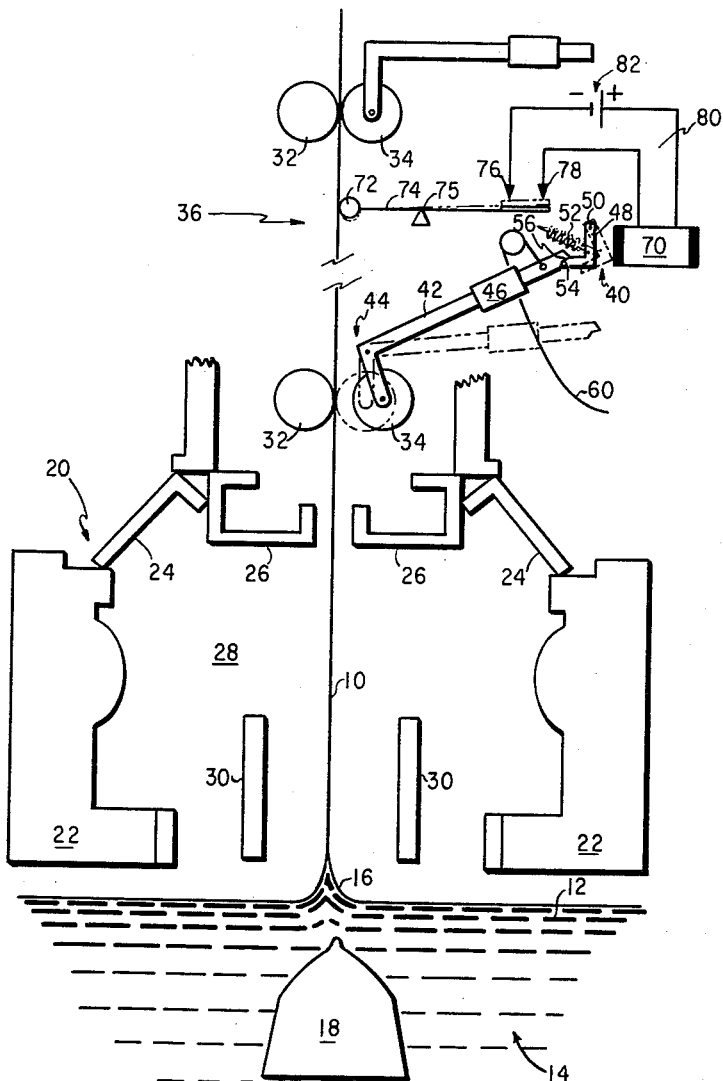
INVENTORS.
RICHARD P. PAROBECK
LEONARD A. KNAVISH AND
DONALD W. MURRAY 3,188,192
APPARATUS FOR CONTINUOUSLY DRAWING SHEET GLASS
Richard P. Parobeck, Brackenridge, and Leonard A. Knavish and Donald W. Murray, Cheswick, Pa., assignors to Pittsburgh Plate Glass Company, Pittsburgh, Pa., a corporation of Pennsylvania
Filed Nov. 2, 1961, Ser. No. 149,557
2 Claims. (Cl. 65—163)

In the production of sheet or window glass by the Pennvernon or Pittsburgh process and the Fourcault process the sheet of glass in the form of a continuous ribbon is drawn vertically upwardly through a cooled drawing chamber. The tractive force for drawing the glass is supplied by a drawing machine. The drawing machine includes a plurality of rolls arranged in pairs which frictionally grip the glass and draw the glass from the bath. One roll of each pair is called a swing roll and is arranged for movement away from the ribbon. Generally, the swing roll is counterweighted to frictionally engage the ribbon while being yielding to permit the passage of various irregularities in the glass. The other roll of each pair is a fixed roll and is mounted for rotation in fixed bearings. Drive mechanisms connect the pairs of rolls, so as to drive them at a constant speed.

The lower pairs of rolls, i.e., the first four or five pairs of rolls at the bottom of the drawing machine, are generally, during production runs, disengaged from the glass ribbon because they have a tendency to mar or otherwise damage the newly formed and deformable ribbon. When the ribbon is first started, these bottom rolls engage the ribbon but the glass being then formed is of relatively poor quality and is relegated to cullet.

At times during a production run the glass ribbon, because of a flaw or defect, or because of temperature variations, cracks or breaks and starts to drop into the bath. This, of course, disrupts production and requires what is known as a reheat and a restart of the ribbon formation. The reheat is required because the glass of the ribbon must be remelted before the ribbon can be reformed. Additional heat is then applied to the bath of glass in the drawing bay. This operation entails a removal of the drawing chamber end walls, and the various coolers, etc., and results in an expensive production delay. The cost of manufacturing the product is materially increased.

After the reheat, the ribbon is restarted. A bait, i.e., generally a metal mesh of the ribbon width, is gradually lowered into the molten glass, so that glass adheres thereto. The bait is gradually withdrawn from the bath and at the proper time the rolls including the bottom ones normally disengaged from the sheet are sequentially moved into engagement with the newly formed ribbon.

The drawing chamber parts are then quickly replaced in the hope that the ribbon can be held. Of course, the quality of the glass drawn at this time is very poor and is relegated to cullet or scrap. Several hours are required to reach a stable drawing condition, so that a further time delay is interposed in the production of the sheet. And the cost of manufacturing the product is further increased. A restart of the type described caused by breakage of the ribbon and slippage of the ribbon into the bath results in a production delay of approximately 12 hours.

It has been found that dropping of the ribbon into the bath upon breaking can be almost completely eliminated if the bottom rolls normally disengaging the ribbon are quickly brought into engaging positions upon noting the slippage of the ribbon. To do this manually requires a continuous observation of the ribbon at all times during its upward travel which is not practical and is difficult because of the length of the path of travel.

However, it has been found that the breakage of the ribbon can be sensed by mechanism associated with the ribbon to emit signals responsive to ribbon speed. If the speed remains constant and in the upward direction, no signals are emitted by the device. However, if a negative speed is noted, indicating a slippage of the ribbon, a signal is emitted by the device. The device is part of a system connected to the normally disengaged rolls, so in response to the emitted signal these rolls are quickly brought into ribbon engaging positions. Thus, dropping of the ribbon into the bath is prevented, eliminating the costly reheat and restart described.

To further explain the invention, attention is directed to the accompanying drawing wherein the single figure schematically illustrates a Pennvernon Pittsburgh drawing arrangement of conventional design and a sensing and control device for sensing breakage and slippage of the ribbon being drawn and in response thereto for quickly lowering the bottom normally disengaged rolls of the drawing machine.

In the apparatus illustrated a continuous ribbon of glass 10 is drawn from a bath of molten glass 12 contained within a drawing bay 14 of a glass melting furnace. The ribbon 10 forms a base or meniscus 16 with the surface of the bath 12. A submerged refractory clay shape, known as a draw bar, identified as 18, defines the plane of the draw and stabilizes the sheet. The ribbon 10 is drawn through a cooled drawing chamber 20 defined in part by spaced L-blocks 22, ventilator coolers 24, catch pan coolers 26 and side walls 28. Machine coolers 30 traversing the ribbon are placed on opposite sides of the plane of the draw. Cooling water flows through the various coolers to absorb radiant energy reaching their surfaces. The tractive force to draw the glass is provided by spaced pairs of drawing rolls 32, 34 of a drawing machine 36. The rolls 32 are rotated in fixed bearings while the rolls 34 are known as swing rolls and are movable into and out of engagement with the ribbon. Counterweights on the ends of levers attached to the swing rolls are provided to urge the rolls into frictional engagement with the ribbon. All rolls are commonly driven for uniformity of speed. Examples of drawing machines are United States Patents Nos. 2,300,522 of J. H. Redshaw, issued November 3, 1942, and 2,974,447 of F. C. Tasher, issued March 14, 1961, both assigned to the assignee of the present application.

The catch pans, in addition to functioning as coolers, collect fragments or chips of glass which fall down through the drawing machine toward the bath.

The lower four or five swing rolls are generally disengaged from the ribbon because they tend to mar the tender surface of the ribbon. The swing rolls are disengaged by physically lifting them away from the glass ribbon. The back or fixed rolls are disengaged, (1) by virtue of the physical suspension of the drawing machine, i.e., the drawing machine is disposed at a slight angle with respect to the plane of ribbon draw, and (2) by virtue of the fact that disengagement of the swing rolls causes the glass ribbon to come forward and away from the back rolls a minute distance and thus the back rolls no longer are in engagement with the glass ribbon. To hold the swing rolls disengaged a latching arrangement 40 is provided so as to be disengageable as will be described upon certain conditions.

The latching arrangement 40 includes the lever arm 42 of bell crank 44 supporting both the roll 34 and a counterweight 46, and a latch 48 pivoted at 50 and biased toward the drawing machine by resilient means 52 shown as a spring. The latch 48 has a foot portion 54 engageable within a notch 56 of lever arm 42. Movement of the latch 48 against the spring 52 permits the swing roll to engage the glass ribbon 10, being biased by the counterweight 46. To relatch the swing roll to its ribbon disengaged position requires a lifting of the arm 42 either manually or with the aid of a rope-pulley arrangement 60.

The latch 48 in the system to be described is a relay arm cooperating with a relay 70. Upon energization of the coil of the relay 70, the latch 48 is drawn towards the coil and away from the drawing machine, thereby disengaging the arm 42 and releasing the swing roll to return to its home position, i.e., in engagement with the glass ribbon. The engagement of the swing roll with the ribbon also causes engagement of the fixed roll of the pair of rolls and the ribbon and restricts the glass ribbon between this swing roll and the corresponding fixed roll on the other side of the glass thereby preventing the glass ribbon from falling back into the tank. In other words, because the rolls now engaging the ribbon are driven, a tractive force is applied thereby to the ribbon. Generally, the engagement of the lower pairs of rolls with the ribbon occurs (1) upon start-up of the draw and (2) upon breakage within the drawing machine of the ribbon above the locations of the lower rolls. Thus, the lower rolls when engaged apply a tractive force to the ribbon between the drawing chamber and the break in the ribbon.

To automate the lowering of the swing rolls of the lower pairs of drawing rolls, any break in the ribbon must be detected and the relay 70 must be energized. To detect any break, a small speed-sensing roller 72 is mounted on one end of a pivotally supported rod 74 and is positioned for rolling contact with the glass. The other or free end of the rod 74 on the opposite side of a fulcrum or pivot point 75 is made of an electroconductive material, such as aluminum. Friction between the roller 72 and the glass 10 maintains the rod 74 at a predetermined level so long as the sheet is being drawn at a constant speed. If the speed of draw decreases due to breakage, etc., slippage of the ribbon occurs and the position of the rod 74 changes. The roller 72, in its changed location is lower with respect to its initial position and the free end of the rod is elevated. Mounted directly above electrically connects the two contacts 76 and 78. This free end of the rod 74 upon being elevated as above, electrically connects the two contacts 76 and 78. This connection closes a series circuit, identified as 80, including the two contacts 76 and 78, a D.C. supply 82 and the coil of the relay 70. The coil of the relay being energized attracts the latch 48, moving the latch 48 to its unlatching position and thus releasing the swing rolls for movement, because of the counterweights, to ribbon engaging location. Upon stabilizing the drawing operation the swing rolls are again disengaged from the ribbon, the relay is deenergized and the arm 74 is free of contact with the contacts 76 and 78. Any further break will actuate the arrangement as described above.

Other sensing arrangements can be used for the same purpose without departing from the spirit of the invention.

The invention is thus defined in the appended claims.

We claim:

1. In an apparatus for drawing sheet glass as a continuous ribbon at a predetermined speed from a bath of molten glass upwardly through a drawing chamber,
   a first pair of drawing rolls disposed with opposing surfaces constantly engaged with opposite faces of the continuous ribbon of glass moving upwardly therebetween,
   a second pair of drawing rolls positioned below said first pair of drawing rolls,
   one of said last-named drawing rolls being movable into and out of engagement with said ribbon and being normally maintained out of engagement with said ribbon,
   speed responsive means engaging a surface of said ribbon for producing an impulse indicative of a differential reduction in the speed of said moving ribbon, said speed responsive means being disposed below said first pair of drawing rolls and above said bath of molten glass, and
   means for moving said movable roll of said second pair of drawing rolls into engagement with said ribbon in response to said impulse and maintaining said first and second pair of rolls in engagement with said ribbon positioned therebetween.

2. Apparatus as recited in claim 1 wherein said speed responsive means includes a roller rolling on said ribbon.

References Cited by the Examiner

UNITED STATES PATENTS

| | | | |
|---|---|---|---|
| 1,514,338 | 11/24 | Redshaw | 65—163 |
| 1,823,357 | 9/31 | Frink | 65—163 X |
| 1,941,924 | 1/34 | Arranlt | 65—163 |
| 2,972,210 | 2/61 | Broman et al. | 65—160 X |

FOREIGN PATENTS

| | | |
|---|---|---|
| 292,448 | 6/28 | Great Britain. |
| 176,590 | 9/61 | Sweden. |

DONALL H. SYLVESTER, *Primary Examiner.*